US010692049B2

(12) United States Patent
Nalliah et al.

(10) Patent No.: US 10,692,049 B2
(45) Date of Patent: Jun. 23, 2020

(54) DISPLAYING A COUNTDOWN TIMER FOR A NEXT CALENDAR EVENT IN AN ELECTRONIC MAIL INBOX

(71) Applicant: Microsoft Technology Licensing, LLC, Redmond, WA (US)

(72) Inventors: Selvaraj Nalliah, Redmond, WA (US); Deborah Eileen Sommers, Seattle, WA (US); David Paul Limont, Seattle, WA (US); Russell Lee Simpson, Jr., Clyde Hill, WA (US); Zohaib Haider Ali, Everett, WA (US); Linda Chen Gray, Kirkland, WA (US); William Dean Saulnier, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 15/605,127

(22) Filed: May 25, 2017

(65) Prior Publication Data

US 2018/0341923 A1    Nov. 29, 2018

(51) Int. Cl.
*G06Q 10/10* (2012.01)
*G06F 16/2458* (2019.01)
*G06F 3/0482* (2013.01)

(52) U.S. Cl.
CPC ..... *G06Q 10/1093* (2013.01); *G06F 16/2477* (2019.01); *G06Q 10/107* (2013.01); *G06F 3/0482* (2013.01)

(58) Field of Classification Search
CPC .. G06Q 10/1095; G06Q 10/10; G06Q 10/107; G06Q 10/109; G06F 3/0482; G06F 15/0266
See application file for complete search history.

(56) References Cited

U.S. PATENT DOCUMENTS

| 5,790,974 | A  | * | 8/1998  | Tognazzini | G01C 21/343 |
| | | | | | 340/988 |
| 6,351,763 | B1 | * | 2/2002  | Kawanaka   | G06Q 10/107 |
| | | | | | 709/206 |
| 7,017,292 | B1 | * | 3/2006  | Abelarde   | G09D 3/00 |
| | | | | | 283/2 |
| 7,035,169 | B2 | * | 4/2006  | Gonzalez   | G04C 21/00 |
| | | | | | 368/251 |
| 7,363,590 | B2 |   | 4/2008  | Kerr et al. | |
| 7,584,253 | B2 |   | 9/2009  | Curbow et al. | |
| 8,069,417 | B2 |   | 11/2011 | Brush et al. | |
| 8,244,566 | B1 | * | 8/2012  | Coley      | G06Q 10/109 |
| | | | | | 705/7.11 |
| 8,296,686 | B1 | * | 10/2012 | Tedesco    | G16H 40/63 |
| | | | | | 715/865 |

(Continued)

OTHER PUBLICATIONS

Filter meeting Updates: Outlook 2010 and 2013 University of Victoria, 2014 (Year: 2014).*

(Continued)

*Primary Examiner* — Scott L Jarrett
(74) *Attorney, Agent, or Firm* — Christopher J. Volkmann; Kelly, Holt & Christenson, PLLC

(57) ABSTRACT

An electronic mail (e-mail) display is generated for a user, showing a mailbox for the user. A next calendar item indication is persistently displayed on the e-mail display. The next calendar item includes a countdown timer showing a time until the next calendar item is scheduled to begin.

16 Claims, 15 Drawing Sheets

(56) References Cited

U.S. PATENT DOCUMENTS

| | | | |
|---|---|---|---|
| 8,745,141 B2 | 6/2014 | Rosenberg et al. | |
| 8,798,445 B2* | 8/2014 | Marks | G06Q 30/02 |
| | | | 386/299 |
| 8,839,139 B2 | 9/2014 | Leukart et al. | |
| 8,910,067 B1* | 12/2014 | Anderson | G06F 3/04817 |
| | | | 715/744 |
| 9,552,560 B1* | 1/2017 | Tomkins | G06Q 50/01 |
| 9,614,804 B2* | 4/2017 | Myles | G06F 16/162 |
| 10,127,188 B2* | 11/2018 | Bastide | G06F 9/451 |
| 10,304,347 B2* | 5/2019 | Wilson | G09B 5/02 |
| 2003/0167310 A1 | 9/2003 | Moody et al. | |
| 2004/0044583 A1* | 3/2004 | Thibault | G06Q 10/107 |
| | | | 705/26.1 |
| 2007/0198314 A1* | 8/2007 | Andrew | G06Q 10/06316 |
| | | | 705/7.19 |
| 2007/0226204 A1* | 9/2007 | Feldman | G06F 16/30 |
| 2007/0233291 A1* | 10/2007 | Herde | G06Q 10/02 |
| | | | 700/91 |
| 2007/0255593 A1* | 11/2007 | Muehlmeier | G06F 19/3481 |
| | | | 705/2 |
| 2007/0279247 A1* | 12/2007 | Rye | G08C 17/02 |
| | | | 340/13.25 |
| 2008/0034047 A1* | 2/2008 | Rosenberg | G06Q 10/109 |
| | | | 709/206 |
| 2008/0201647 A1* | 8/2008 | Lagerstedt | G01W 1/02 |
| | | | 715/748 |
| 2009/0158200 A1* | 6/2009 | Palahnuk | G06Q 30/00 |
| | | | 715/781 |
| 2010/0159967 A1* | 6/2010 | Pounds | H04L 51/14 |
| | | | 455/466 |
| 2010/0241663 A1* | 9/2010 | Huang | G06Q 30/02 |
| | | | 707/770 |
| 2010/0254223 A1* | 10/2010 | Jones | G04F 1/005 |
| | | | 368/10 |
| 2010/0274865 A1* | 10/2010 | Frazier | G01C 21/362 |
| | | | 709/207 |
| 2011/0255379 A1* | 10/2011 | Vidal | G04G 9/047 |
| | | | 368/70 |
| 2011/0296312 A1* | 12/2011 | Boyer | G06F 3/0488 |
| | | | 715/736 |
| 2012/0136572 A1* | 5/2012 | Norton | G01C 21/3407 |
| | | | 701/465 |
| 2012/0179606 A1 | 7/2012 | Sagi et al. | |
| 2012/0191500 A1* | 7/2012 | Byrnes | G06Q 10/1095 |
| | | | 705/7.19 |
| 2012/0239451 A1* | 9/2012 | Caligor | G06Q 10/00 |
| | | | 705/7.21 |
| 2012/0242488 A1* | 9/2012 | Wilson | G08B 21/10 |
| | | | 340/601 |
| 2013/0042169 A1* | 2/2013 | Reedy | H04L 67/02 |
| | | | 715/202 |
| 2013/0151149 A1* | 6/2013 | Kristinsson | G06Q 10/1095 |
| | | | 701/533 |
| 2013/0282836 A1* | 10/2013 | DeLuca | G06Q 10/10 |
| | | | 709/206 |
| 2013/0297468 A1* | 11/2013 | Hirsch | G06Q 40/00 |
| | | | 705/32 |
| 2014/0006993 A1* | 1/2014 | Deluca | G06Q 10/109 |
| | | | 715/772 |
| 2014/0059487 A1* | 2/2014 | Baumann | G06F 3/0482 |
| | | | 715/811 |
| 2014/0244734 A1* | 8/2014 | Nutt | H04L 51/046 |
| | | | 709/203 |
| 2014/0278086 A1* | 9/2014 | San Filippo | G01C 21/3423 |
| | | | 701/527 |
| 2014/0293755 A1* | 10/2014 | Geiser | G04B 19/24 |
| | | | 368/12 |
| 2015/0007056 A1* | 1/2015 | Cohen | H04L 65/403 |
| | | | 715/753 |
| 2015/0127403 A1* | 5/2015 | Petty | G06F 3/0481 |
| | | | 705/7.18 |
| 2015/0135088 A1* | 5/2015 | Lim | H04W 4/21 |
| | | | 715/745 |
| 2015/0160799 A1* | 6/2015 | Won | G06F 3/0482 |
| | | | 715/739 |
| 2016/0003637 A1* | 1/2016 | Andersen | G06F 16/29 |
| | | | 701/519 |
| 2016/0012368 A1* | 1/2016 | O'Connell | G06Q 10/06316 |
| | | | 705/7.26 |
| 2016/0034133 A1* | 2/2016 | Wilson | G06F 3/0488 |
| | | | 715/772 |
| 2016/0042324 A1* | 2/2016 | Johnson | G06Q 10/1095 |
| | | | 705/7.19 |
| 2016/0063450 A1* | 3/2016 | Tsay | G06Q 10/1095 |
| | | | 705/7.19 |
| 2016/0224752 A1* | 8/2016 | Van Wyck | G06F 19/3418 |
| 2016/0234276 A1* | 8/2016 | Ouyang | H04L 65/403 |
| 2016/0239354 A1* | 8/2016 | Shen | G06Q 10/09 |
| 2016/0267228 A1* | 9/2016 | Van Wyck | G06F 19/3418 |
| 2016/0277330 A1* | 9/2016 | Jawaharlal | H04L 51/08 |
| 2016/0358125 A1* | 12/2016 | Bastide | G06Q 10/1095 |
| 2016/0360485 A1* | 12/2016 | McGavran | G06F 16/2358 |

OTHER PUBLICATIONS

How to filter meeting invites/updates/responses from emails in Outlook? Extendoffice.com, Apr. 2015 (Year: 2015).*

MS Office Outlook 2007 Users Guide California State University Northridge, Oct. 20, 2009 (Year: 2009).*

Create a Countdown in your Outlook Calendar OfficeCalendar, Lookout Software, Oct. 10, 2006 (Year: 2006).*

Display days left before task needs completion MSOutlook.info, Apr. 5, 2013 (Year: 2013).*

Iilan, Alex, How to add a Countdown Timer to your Email Litmus. com, Apr. 2015, Retrieved from Archive.org Aug. 13, 2019 (Year: 2015).*

Preppernau, Joan et al., Microsoft Outlook 2007 Step by Step Microsoft Press, 2007 (Year: 2007).*

"International Search Report and Written Opinion Issued in PCT Application No. PCT/US2018/029241", dated Jun. 8, 2018, 9 Pages.

Pinola, Melanie, "Beyond Google Calendar and Apple Calendar: The 18 Best Apps to Manage Your Schedule", https://zapier.com/blog/best-calendar-apps/, Jun. 28, 2016, 46 pages.

Poremsky, Diane, "Calendar Insights Template for Excel 2016", https://www.slipstick.com/office-365/outlook-web/owa-calendar-insights-excel-2016/, Published on: Feb. 23, 2016, 3 pages.

* cited by examiner

AMCE - Mail

Search mail and p...

Folder(s) 278
Inbox
Outbox
Sent Items

282

Inbox 280 Filter

Next Team Breakfast, Skillet — In 10 mins — 3:01PM
Dinner
Today

Max Headroom; Miguel G... 3:01PM
Great news! (2)
Thanks for sharing!

Jack White
Upcoming Marketing Seminar 3:01PM
The difference between doer...

Carole Poland
Invitation – Breakfast Series  Mon 3:14 PM
What lies before us and w...

John Walker  Mon 3:14 PM
Key Principals
What lies before us and w...

Office of the CEO
CEO Town Hall  3:38 PM
Hi all. Our next CEO Town H...

Anna Gonzalez; Diane K...
Can someone share the last r... 3:14 PM
What lies before us and wh...

Joe Kelly  2:42 PM
Spreadsheet Discrepancies
But there's still time to g...

Reading Pane

284

342

286

< Wednesday 23 June >

9AM

10AM

11AM — Team Breakfast / Skillet Diner

12PM — Exec Planning Meeting / Boardroom

1PM — Marketing Sync / Meeting Room B

2PM

3PM

4PM — Marketing Sync / Meeting Room B

DISPLAYING A COUNTDOWN TIMER FOR A NEXT CALENDAR EVENT IN AN ELECTRONIC MAIL INBOX

BACKGROUND

Computing systems are currently in wide use. Some computing systems include electronic mail (e-mail) computing systems and calendar computing systems. These systems can be combined into a single application, or they can be different applications.

E-mail computing systems surface user interfaces that allow users to perform e-mail functions, such as author, send, receive and organize e-mail messages. They also allow the user to configure folders and filter settings, among other things.

Calendar computing systems surface user interfaces that allow users to perform calendar operations. Calendar operations can include such things as scheduling tasks or appointments, scheduling meetings, sending and receiving meeting requests, among other things.

The discussion above is merely provided for general background information and is not intended to be used as an aid in determining the scope of the claimed subject matter.

SUMMARY

An electronic mail (e-mail) display is generated for a user, showing a mailbox for the user. A next calendar item indication is persistently displayed on the e-mail display. The next calendar item includes a countdown timer showing a time until the next calendar item is scheduled to begin.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4A-4F show examples of user interface displays.

DETAILED DESCRIPTION

Figure 1:
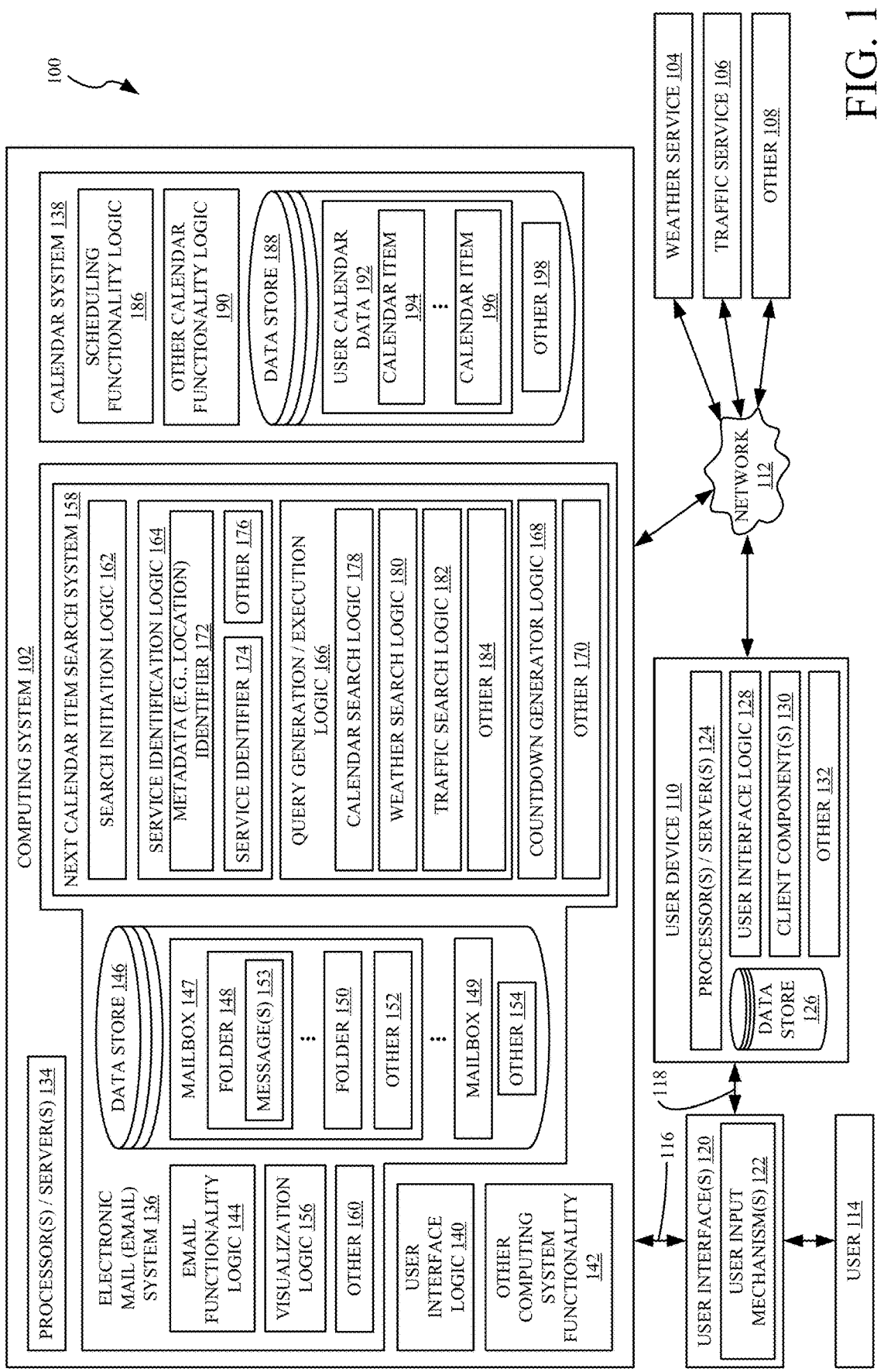
FIG. 1 is a block diagram of one example of a computing system architecture.

FIG. 1 is a block diagram of one example of computing system architecture 100. Architecture 100, in the example shown in FIG. 1, shows computing system 102 connected to a variety of other services, such as weather service 104, traffic service 106, or other services 108, as well as to a user device 110, over network 112. Network 112 can be any of a wide variety of different types of networks, such as a wide area network, a local area network, a cellular communication network, a near field communication network, or any of a variety of other networks or combinations of networks. In the example shown in FIG. 1, user 114 can access computing system 102 either directly, as indicated by arrow 116, or through user device 110, as indicated by arrow 118. In either case, user interfaces 120 are generated with user input mechanisms 122, for interaction by user 114. User 114 illustratively interacts with user input mechanisms 122 in order to control and manipulate user device 110 and/or computing system 102.

User device 110 can include one or more processors or servers 124, data store 126, user interface logic 128, one or more client components 130 (that can be components of one or more services hosted by computing system 102), and it can include a wide variety of other items 132. In a scenario in which user 114 uses user device 110, user interface logic 128 either by itself, or under the control of other items, generates user interfaces 120 and detects user interactions with user input mechanisms 122. It can provide an indication of those interactions to other items in architecture 100.

Computing system 102 illustratively includes one or more processors or servers 134, electronic mail (e-mail) system 136, calendar system 138, user interface logic 140, and it can include a wide variety of other computing system functionality 142. It will be noted that calendar system 138 can be within, and part of, email system 136 or the two systems can be separate. They are shown as separate systems in FIG. 1 for the sake of example only.

E-mail system 136 illustratively includes e-mail functionality logic 144, data store 146 visualization logic 156, new calendar item search system 158, and it can include other items 160. Data store 146 can include one or more mailboxes 147-149 and other items 154. Each mailbox can include, a set of folders 148-150, each of which includes messages 153, and it can include other items 152 as well. Next calendar item search system 158 illustratively includes search initiation logic 162, service identification logic 164, query generation/execution logic 166, countdown generator logic 168, and it can include other items 170. Service identification logic 164, itself, can include metadata (e.g., location) identifier 172, service identifier 174, and other items 176. Query generation/execution logic 166, itself, can include calendar search logic 178, weather search logic 180, traffic search logic 182, and a wide variety of other items 184.

Calendar system 138 can include scheduling functionality logic 186, data store 188, and a wide variety of other calendar functionality logic 190. Data store 188, itself, illustratively includes user calendar data 192 corresponding to a user. User calendar data 192 can include a set of calendar items 194-196, each of which appear on a day and/or at a time, and for a duration, within a user's calendar. Data store 188 can include a wide variety of other items 198 as well.

Before describing the operation of architecture 100 in more detail, a brief overview of some of the items in architecture 100, and their operation, will first be provided. E-mail functionality logic 144 illustratively exposes interfaces (either by itself or through user interface logic 140) that allow user 114 to perform a wide variety of e-mail functions, such as authoring and sending e-mail messages, receiving, viewing, deleting and organizing e-mail messages, sending group messages, organizing folders and filters, etc. Data store 146 illustratively stores mailbox data 147-149 for different mailboxes for different users. As mentioned above, each mailbox 147 can include a set of folders 148-150, each of which have one or more messages 152 in them. A number of examples of this are described in greater detail below.

Scheduling functionality logic 186 in calendar system 138 illustratively allows user 114 to schedule items on his or her calendar. When this occurs, they are represented by calendar items 194-196 in the user calendar data 192 corresponding to the calendar for user 114. Other calendar functionality logic 190 allows user 114 to perform other calendar functionality, such as to send meeting requests, etc.

Next calendar item search system 158 in email system 136 illustratively uses search initiation logic 162 to determine whether it is time to search for a next calendar item, so an indication of that next calendar item can be displayed within the user's mailbox. This can be done, for instance, on an intermittent or periodic basis, it can be triggered by changes to the user's calendar, or it can be done in other ways.

Query generation/execution logic 166 then uses calendar search logic 178 to search user calendar data 192 for user 114, in calendar system 138. It identifies the next calendar item for user 114. Service identification logic 164 then uses metadata identifier 172 to identify metadata (such as the location) corresponding to that calendar item. Service identifier 174 can then identify other services of interest (such as weather service 104, traffic service 106, etc.) that may be searched, based upon the metadata (e.g., location) of the next calendar item for the user. For instance, if the next calendar item for user 114 is an outdoor meeting or event, then service identifier 174 may identify that weather service 104 should be searched for weather information. In that case, weather search logic 180 illustratively searches weather service 104 to obtain weather forecast information for the location of the user's outdoor meeting or event, at the meeting or event time. If the location of the next item is a remote location where the user must travel, then service identifier 174 may identify traffic service 106 as a service that should be searched for traffic information. In that case, traffic search logic 182 searches for traffic information from traffic service 106. The traffic information may, for example, identify a best route or travel time when traveling from the user's current location to the location of the next calendar item. Service identifier 174 can identify a wide variety of other services that may be searched by other items 184 in query generation/execution logic 166.

Countdown generator logic 168 generates a countdown identifier (such as indicating minutes, hours, etc.) to the scheduled start time of the user's next calendar item. Visualization logic 156 generates a visual representation of the user's next calendar item, along with the countdown indicator generated by countdown generator logic 168. User interface logic 140 illustratively surfaces that visualization on a user interface 120 for user 114. Some examples of this are also described in greater detail below.

Figure 2:
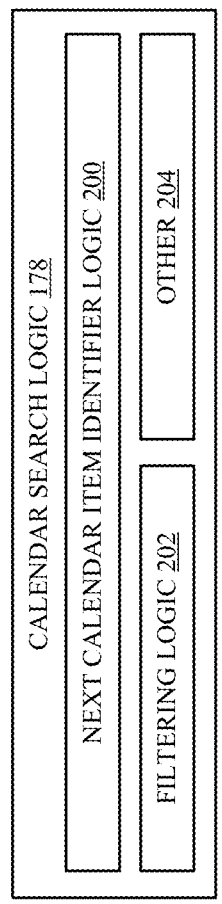
FIG. 2 is a block diagram showing one example of calendar search logic in more detail.

FIG. 2 is a block diagram showing one example of calendar search logic 178, in more detail. In the example shown in FIG. 2, calendar search logic 178 includes next calendar item identifier logic 200, filtering logic 202, and it can include a wide variety of other items 204. Next calendar item identifier logic 200 illustratively identifies the next calendar item on the calendar of user 114. In one example, it can identify the next calendar item that begins at or after the present time. In another example, it can identify, as the next calendar item, an item on the user's calendar that began up to a threshold time before the present time (such as 10 minutes ago) as well. Filtering logic 202 then applies any desired filtering criteria to determine whether the next calendar item identified should be filtered out, and another calendar item identified. For instance, it may be that calendar search logic 178 does not surface all day meetings or other day long items on the user's calendar. In that case, filtering logic 202 would apply an "all day meeting" filter criterion to filter out any calendar items that were all day meetings. Thus, those calendar items would not be output by calendar search logic 178 as the next calendar item for user 114. Instead, it would be the next subsequent calendar item that has a next subsequent scheduled start time and that is not filtered out based on any filter criteria.

Figure 3A:
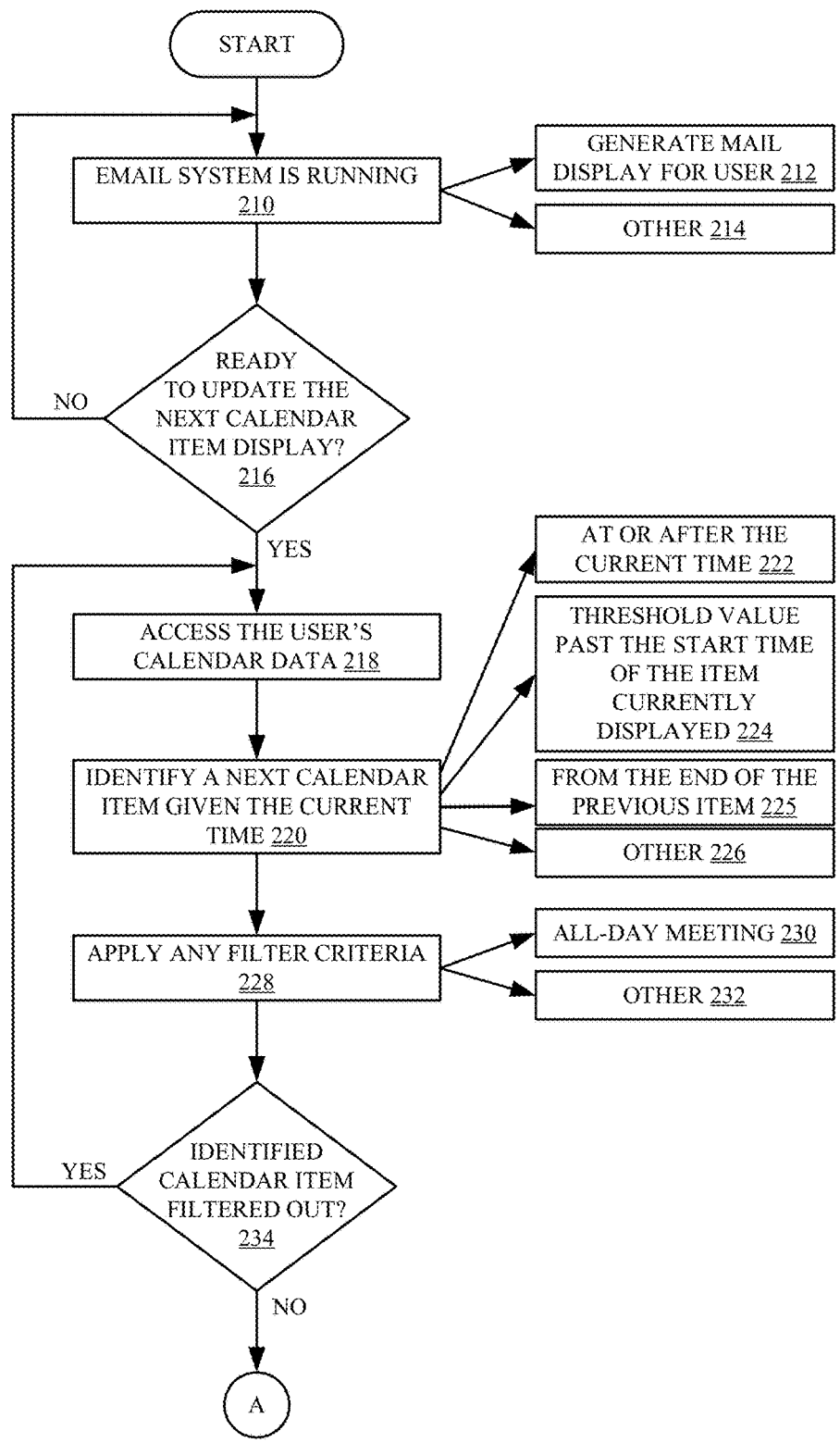
FIGS. 3A and 3B (collectively referred to herein as FIG. 3) show a flow diagram illustrating one example of the operation of the architecture illustrated in FIG. 1.
Figure 3B:
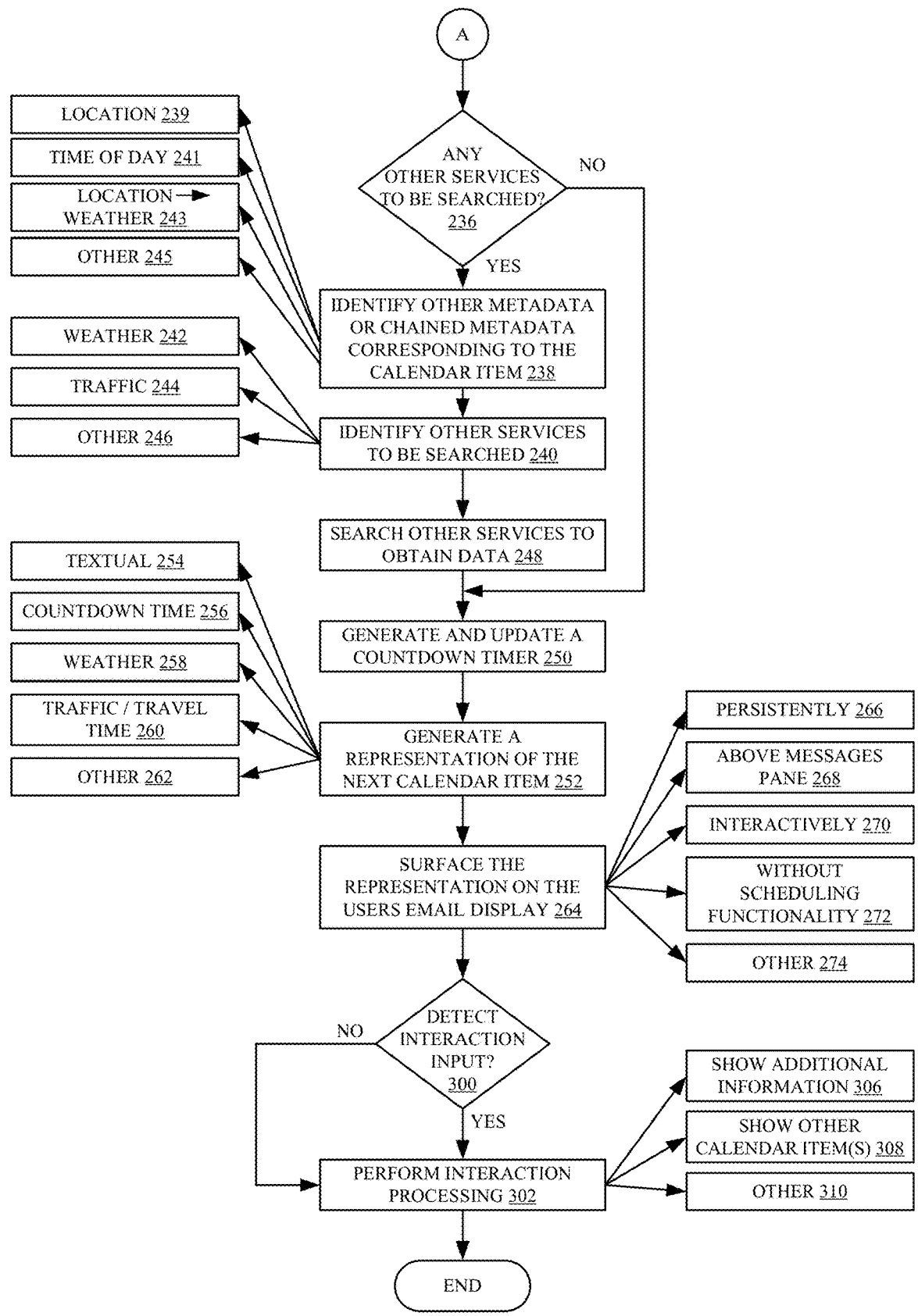

FIGS. 3A and 3B (collectively referred to herein as FIG. 3) show a flow diagram illustrating one example of the operation of architecture 100, shown in FIG. 1, in surfacing a next calendar item, for user 114, in the mailbox display of user 114. FIGS. 4A-4E show some examples of user interface displays that can be generated. FIGS. 1, 3, and 4A-4E will now be described in conjunction with one another.

It is first assumed that e-mail system 136 is running on computing system 102. This is indicated by block 210 in the flow diagram of FIG. 3. In one example, it may be generating an e-mail display for user 114. This is indicated by block 212. It may be running and displaying other items, in other ways as well, and this is indicated by block 214.

At some point, search initiation logic 162 determines whether it is time to update the next calendar item display that is displayed on the e-mail user interface display of user 114 (some examples of which are described below with respect to FIGS. 4A-4E). This is indicated by block 216. This can be done, as mentioned above, in a variety of ways. For instance, it may be that the next calendar item display is updated periodically (such as every 10 minutes). It may be that it is updated based on a change to the user's calendar data. It may be updated in a wide variety of other ways as well.

Assuming that it is time to update the next calendar item display, then next calendar item identifier logic 200 in calendar search logic 178 accesses the calendar data 192 for user 114. This is indicated by block 218. This can be done by calendar system 138 exposing a search interface so that logic 178 can search through the user's calendar data 192. It can be done in other ways as well.

Next calendar item identifier logic 200 then identifies a next calendar item, on the calendar of user 114, given the current time. This is indicated by block 220. For instance, in one example, logic 200 looks for the next calendar item that begins at or after the current time. This is indicated by block 222. In another example, logic 200 can wait until a threshold amount of time after the start time of the currently display calendar item. For instance, if the currently displayed next calendar item is a meeting that begins at 10:00 AM, then next calendar item identifier logic 200 may look for the next calendar item that begins at or after 12:10. Identifying a next calendar item that begins a threshold amount of time after the start time of the currently displayed calendar item is indicated by block 224 in the flow diagram of FIG. 3. Logic 200 can also identify the next calendar item by searching from the end time of the previous calendar item. This is indicated by block 225. The next calendar item, given the current time, can be identified in other ways as well, and this is indicated by block 226.

Filtering logic 202 then applies any desired filtering criteria to filter out calendar items that need not be displayed as the next calendar item in the user's e-mail display. This is indicated by block 228. It will be noted that filtering can take place as part of the process of identifying the next calendar item in block 220. It is described separately for the sake of example only. For instance, in one example, filtering logic 202 filters out all day meetings as indicated by block 230. It can apply a wide variety of other filter criteria as well, and this is indicated by block 232. If the currently selected next calendar item is filtered out by filtering logic 202, then the process reverts to block 218 where next calendar item identifier logic 200 accesses the calendar data for user 114 to identify the next subsequent calendar item, and processing continues at blocks 220, 228, etc. Determining whether the selected calendar item is filtered out is indicated by block 234 in the flow diagram of FIG. 3.

Once a next calendar item is selected, that is not filtered out, then service identification logic 164 determines whether any additional information should be obtained for the next calendar item, from any other services. This is indicated by block 236 in the flow diagram of FIG. 3. The additional information may include a wide variety of information such as metadata or chained metadata corresponding to the calendar item, and metadata identifier 172 can identify such metadata, as indicated by block 238. The metadata can include, as an example, location 239, time of day 241, chained metadata such as location weather 243, among others 245. Service identifier 174 then identifies any other services that are to be searched, for additional information about the next identified calendar item. This is indicated by block 240. In one example, the additional services or other services can be identified based upon the location of the next calendar item. If it is outside, then weather service 104 can be searched to obtain weather information as indicated by block 242. If the location is remote, then traffic service 106 can be searched to obtain traffic information, as indicated by block 244. A wide variety of other services can be identified to obtain a wide variety of other information as well, and this is indicated by block 246.

Some example scenarios might include seeing that it's a dinner meeting based on the provided location, the time of day, the title, and searching a service to obtain details of restaurants or bars in the area. Or, in a more personal assistant style scenario, searching a weather service to know that it's raining to provide extra buffer time for travel.

The other search logic (such as weather search logic 180 and traffic search logic 182) is then used to search the other sources to obtain the additional data. This is indicated by block 248.

Countdown generator logic 168 generates, and intermittently or continually updates, a countdown timer. This is indicated by block 250. For instance, if the identified next calendar item starts in 35 minutes, then countdown generator logic 168 generates a countdown indicator indicating that there are 35 minutes to go before the next calendar item is scheduled to occur. It can update the countdown timer indicator periodically (such as every minute, every second, etc.). It can update the countdown timer in other ways as well. For instance, the countdown timer may be an analog clock display that is updated. It may be a status bar display that is updated to go from fifteen minutes down to zero minutes. It can be a static start time display that shows the start time of the calendar item. These are examples only.

Once the next calendar item is identified, any other information is obtained from other services, and the countdown timer indication is generated, then visualization logic 156 illustratively generates a representation of the next calendar item that has been identified. This is indicated by block 252. The representation can include a textual description or title 254 for the next calendar item. It can include the countdown timer indicator 256, it can include the other information such as weather information 258, traffic or travel time information 260, and it can include a wide variety of other information 262.

Visualization logic 156 then surfaces the representation on the user's e-mail display. This is indicated by block 264. In one example, the representation is surfaced persistently, in that it is unlike a notification which is displayed for a certain amount of time and then is hidden or removed (or can be dismissed) from the display. Displaying the representation persistently (that is, continuously) is indicated by block 266 in the flow diagram of FIG. 3.

In one example, it is displayed above a messages pane in the user's mailbox, and this is indicated by block 268. Again, examples of this are illustrated below in FIGS. 4A-4B. It can be interactive, in that the user can interact with it to perform operations (such as to see additional information, etc.). This is indicated by block 270. Also, in one example, the representation is displayed without any scheduling functionality, as indicated by block 272. For instance, it is displayed without user input actuators that allow a user to edit a calendar item, to schedule a new calendar item, etc. These types of actuators can inhibit the surfaced representation, from providing a simple indicator as to the next calendar item for the user, and how long before that calendar item occurs. Providing additional controls, user input mechanisms, buttons, etc. for performing scheduling functionality, and providing a great deal of additional functionality can clutter the display. It can undesirably cover e-mail display real estate on the display screen. It can be confusing and cumbersome to use, etc.

Figure 4A:
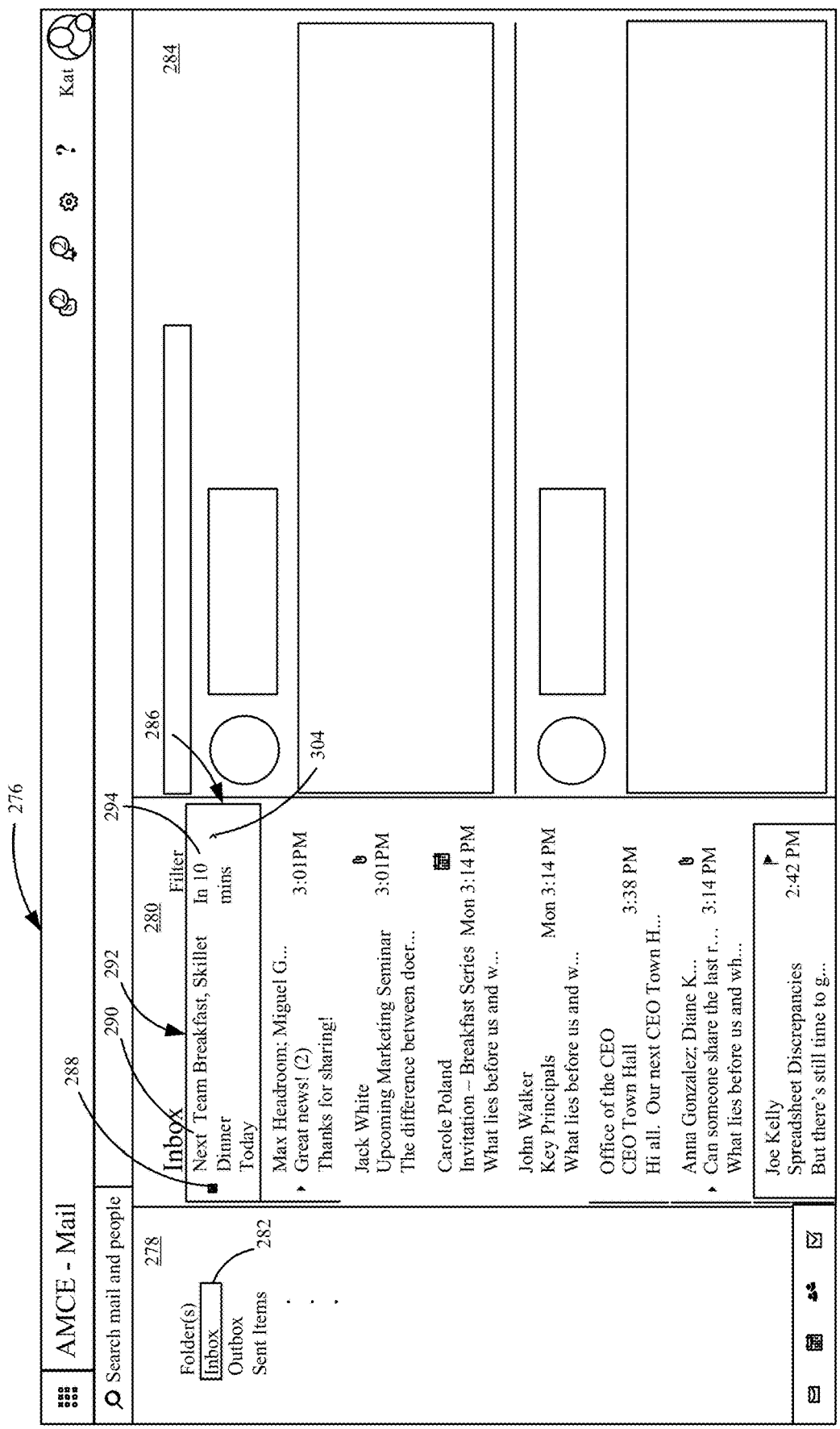

The representation can be surfaced in the user's e-mail display in other ways as well. This is indicated by block 274. FIG. 4A shows one example of a surfaced representation. It can be seen in FIG. 4A that a user's e-mail display 276 is being shown. The e-mail display includes a folders pane 278 that shows various folders for the user, such as the user's inbox, outbox, sent items, etc. It also shows a messages pane 280 that shows the messages in the particular folder selected in pane 278. It can be seen in FIG. 4A that the inbox folder 282 has been selected so that the messages in the user's inbox are shown in pane 280. Display 276 also includes a reading pane 284 that shows a message that is selected from the messages pane 280.

FIG. 4A also shows that a representation of the next calendar item, shown generally at 286, is displayed on the e-mail display 276. In the example illustrated, it is located below the heading or title of the messages pane 280 (below the word "Inbox") but above the first message in the messages pane 280. It includes a number of things, such as a calendar item symbol 288 indicating that it corresponds to a calendar item. A textual description "next" represented by number 290, indicating that it is the next calendar item on the user's calendar, and a brief textual description 292 briefly describing the calendar item. The textual description 292 may be taken from the title or description of the calendar item in the user's calendar data, it can be a paraphrase generated from that information, or it can be generated in other ways. Representation 286 also illustratively includes a countdown indicator 294 that indicates the countdown time which is a time before the next calendar item is scheduled to occur.

In one example, the representation 286 for the next calendar item is persistently displayed until a threshold time after its start time. For instance, if it was scheduled to start at noon, then representation 286 for that calendar item is illustratively displayed until a threshold time after noon (such as 10 minutes—meaning that it would be displayed until 12:10), at which time the next chronologically occurring calendar item in the user's calendar data will be identified and a representation 286 will be displayed for that calendar item. In this way, even if the user is slightly late for the next calendar item currently being displayed, the user will still be aware that it is occurring some time after it has started.

Also, in one example, the threshold time period during which the next calendar item representation is displayed, after its scheduled start time, can be variable based on the item's duration or based on other criteria. For example, if the next calendar item is scheduled to last for a one hour duration, then a first threshold (such as 10 minutes) may be used. However, if the next calendar item is scheduled to last for a three hour duration, then a different threshold (such as 15 minutes) may be used. In this way, the next calendar item representation will be displayed for a longer period of time, after its scheduled start time, if the duration of that calendar item is longer. This is only one example.

Also, in one example, representation 286 is interactive, in that the user can interact with it in certain ways to perform certain actions. User interface logic 140 may illustratively detect a user interaction and provide it to visualization logic 156 which may change the visualization or perform other actions based on the user interaction. Detecting an interaction input by the user is indicated by block 300 in the flow diagram of FIG. 3. Performing interaction processing is indicated by block 302. The interaction processing may take a wide variety of different forms, based upon the particular user interaction. For instance, when the user actuates an actuatable display element (such as actuatable display element 304) on representation 286, this may cause visualization logic 156 to display additional information about the next calendar item. This is indicated by block 306 in the flow diagram of FIG. 3. The additional information may include the weather information, the traffic or travel time, etc. Further, when the user actuates or hovers over or otherwise interacts with representation 286, then visualization logic 156 may show other calendar items (such as those coming after the next calendar item currently displayed). This is indicated by block 308 in the flow diagram of FIG. 3. Interaction processing can be performed in a wide variety of other ways as well, and this is indicated by block 310.

Figure 4B:
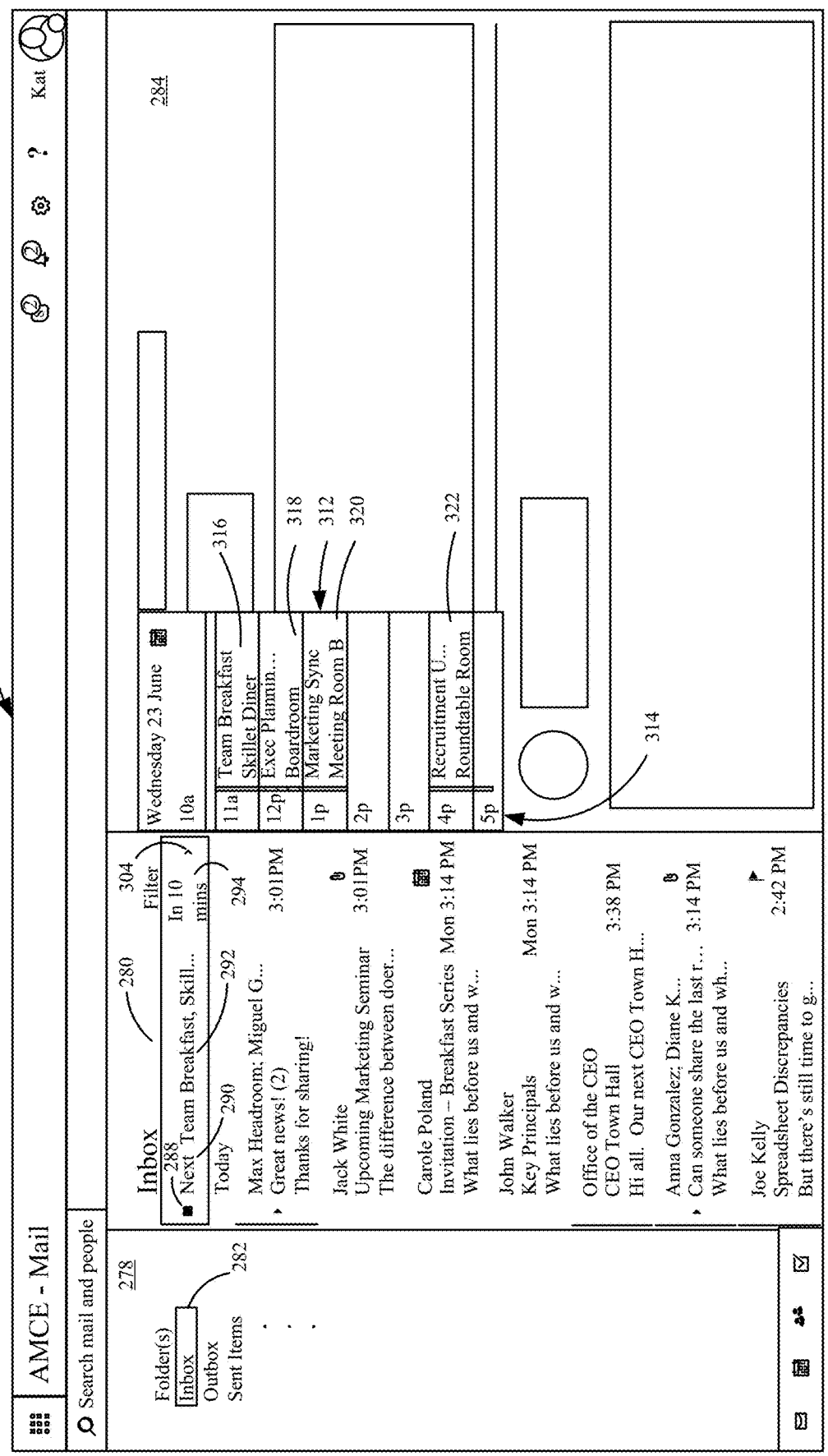

FIGS. 4B-4E show examples of different interfaces and different interaction processing. FIG. 4B is similar to FIG. A, and similar items are similarly numbered. However, FIG. 4B shows that the user has now actuated actuatable display element 304. In the example shown in FIG. 4B, visualization logic 156 then interacts with query generation/execution logic 166 and calendar search logic 178 to search the user calendar data 192 for user 114 to show additional calendar items occurring after the next calendar item represented by visual representation 286. In the example shown in FIG. 4B, this information is shown using a display element 312. Display element 312 shows a calendar timeline 314 with calendar items displayed along the timeline 314, at the scheduled start time and for the scheduled duration. Thus, the calendar item 316 corresponds to that represented by visual representation 286. Additional calendar items 318, 320 and 322 are shown for the sake of example only.

Figure 4C:
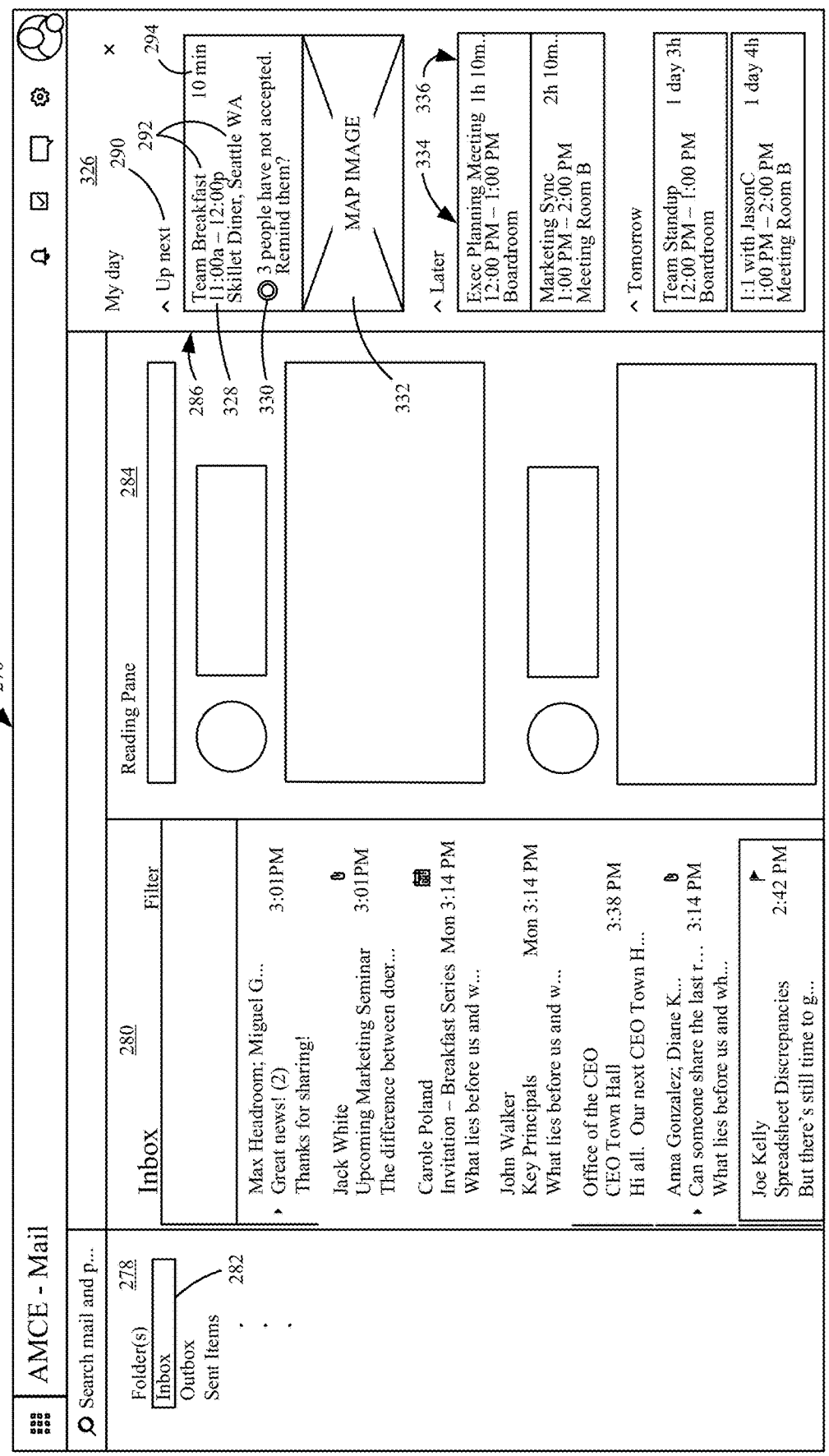

FIG. 4C is also similar to FIG. A, and similar items are similarly numbered. However, instead of displaying the next calendar item representation 286 on the top of the messages pane 280, it is displayed in a right panel 326 located to the right of reading pane 284. The next calendar item representation 286 includes some of the same items shown in FIG. 4A, and they are similarly numbered but it also specifically illustrates the start time 328. Also, it shows a reminder element 330 that can be actuated to remind those people who will be attending the next calendar item that it is about to begin. Similarly, it includes other information, such as map information 332 showing a location where the calendar item is to occur. In addition, it shows later calendar items illustrated generally at 334 as well, for the same day, and for a next subsequent day. It includes a countdown timer shown generally at 336, for each of those items.

Figure 4D:
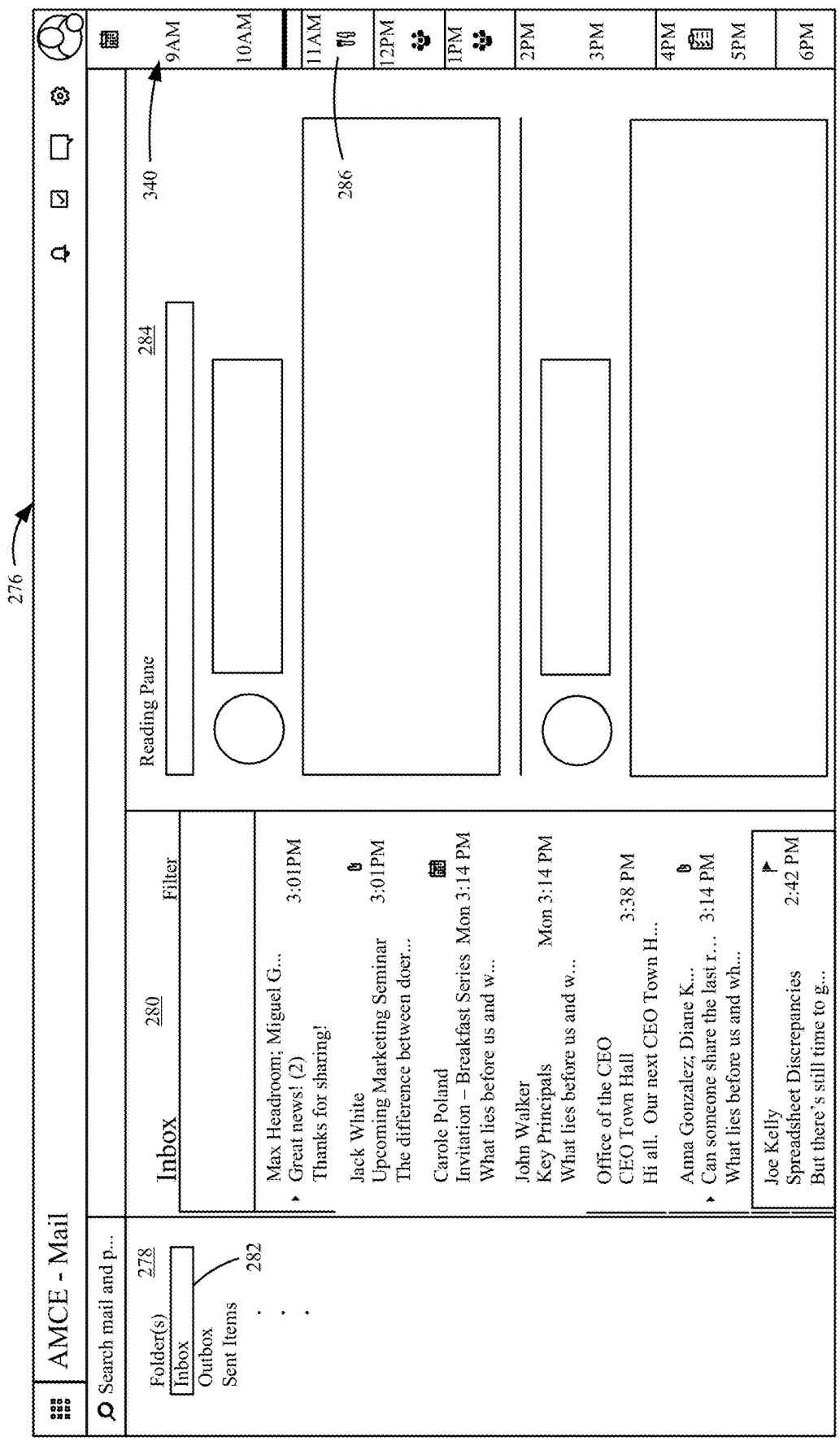
Figure 4F:
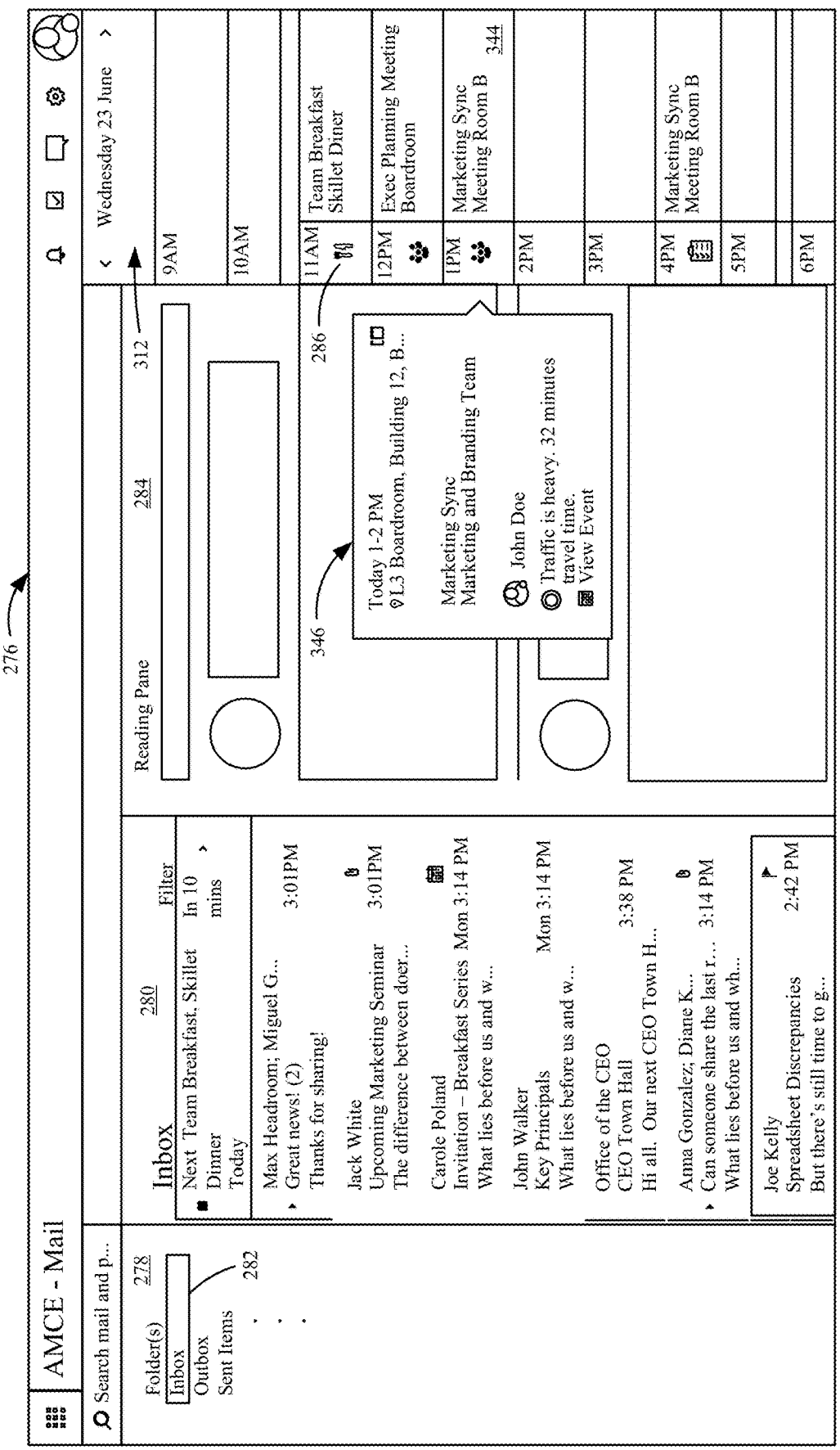

FIGS. 4D-4F show yet another example of displaying the next calendar item. FIG. 4D is similar to FIG. A, and similar items are similarly numbered. However, instead of having the next calendar item representation 286 displayed as shown in previous figures, it is now displayed on a right rail display shown generally at 340. Right rail display includes a timeline, and a set of calendar items shown along the timeline, for the present day. In the example illustrated, the next calendar item is displayed generally at 286. The start time is indicated, and a category (such as a meal category) is illustrated as well.

FIG. 4E shows that, when the user interacts with the right rail display 340, a next item panel slides in from the right of the display. The panel is illustrated generally at 342. It now shows more detailed information corresponding to the next calendar item representation 286, and the additional calendar items displayed along the timeline. In the example shown in FIG. 4E, each of the display elements representing the calendar items displayed along the timeline are user actuatable elements. Therefore, when the user actuates them (such as by clicking on them, double clicking them, hovering over them, tapping them, etc.), visualization logic 156 generates an additional visualization showing additional information. FIG. 4F shows one example of this.

In FIG. 4F, the user has actuated the visual display element 344 corresponding to a calendar item entitled "Marketing Sync". When this occurs, visualization logic 156 displays additional information in a corresponding display 346. The additional information can show the location of the calendar item, who organized it, it can provide traffic information, and additional actuators to view additional information about the calendar item.

It can thus be seen that the present description improves the computing system by incorporating calendar information into the e-mail display of the computing system. The calendar information, however, is incorporated in such a way that it is easily accessible and digestible by a user. It displays a next calendar item with a countdown time, persistently, so a user can easily identify the user's next calendar item and how much time the user has before it is scheduled to begin. The user need not perform any navigation steps to navigate away from the e-mail display and into the calendar display to see this information. This reduces the computing overhead needed to navigate away from one display and generate a separate display. Instead, the next calendar item is intermittently identified and a representation is generated for that calendar item, along with a countdown timer that is updated to show a countdown time. The next calendar item representation, in one example, does not include controls for performing any other scheduling functions (such as to schedule a meeting, delete one, schedule a task or appointment, send a meeting request, etc.). This reduces the complexity of the interface, the computing system overhead, and the cumbersome nature of identifying a next calendar over previous systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
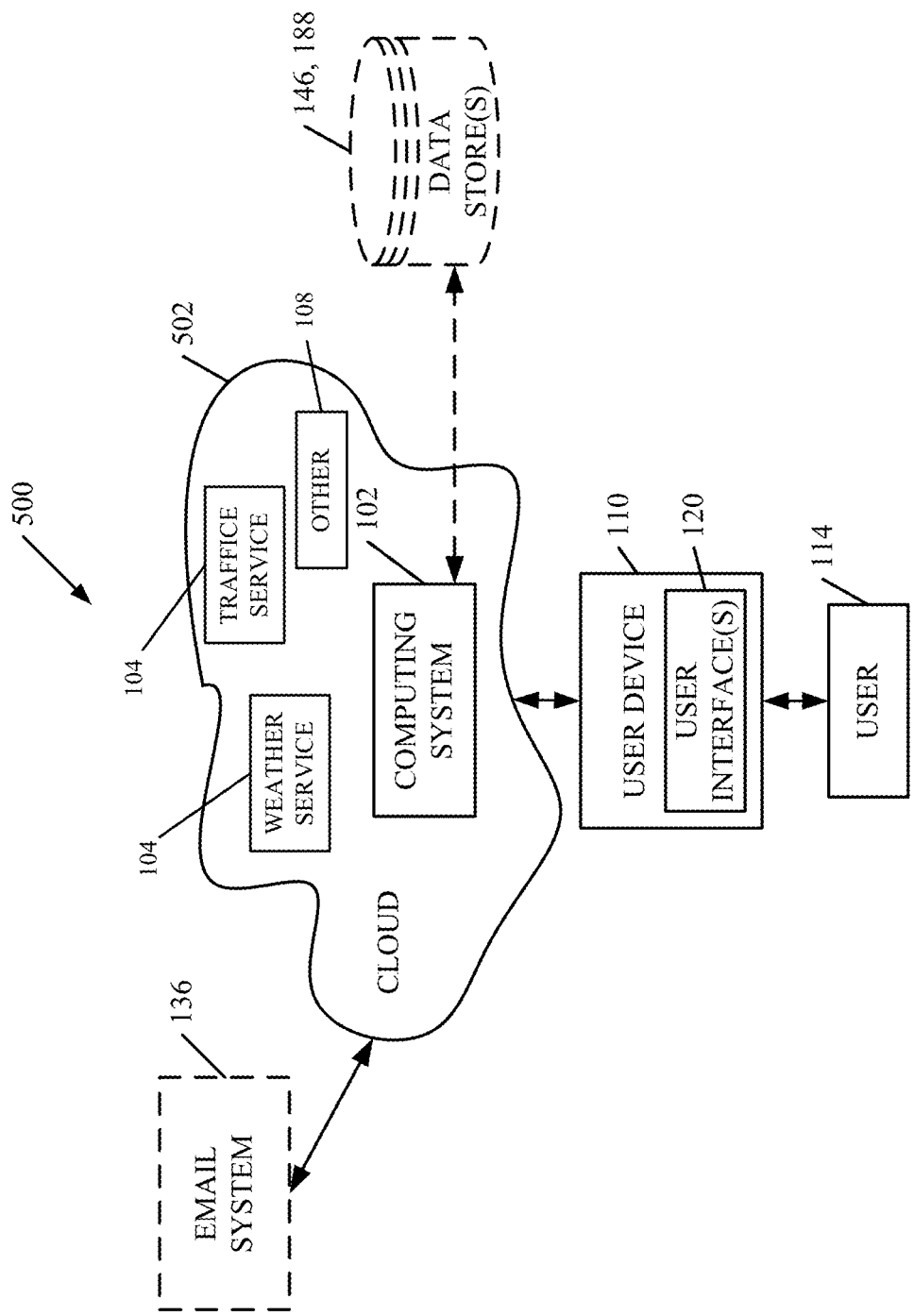
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 and services 104-108 can be located in cloud 502 (which can be public, private, or a combination where portions are public while others are private). Therefore, user 114 uses user device 110 to access those systems through cloud 502.

FIG. 5 also depicts another example of a cloud architecture. FIG. 5 shows that it is also contemplated that some elements of computing system 102 can be disposed in cloud 502 while others are not. By way of example, data stores 146, 188 can be disposed outside of cloud 502, and accessed through cloud 502. In another example, email system 136 can be outside of cloud 502. Regardless of where they are located, they can be accessed directly by device 110, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
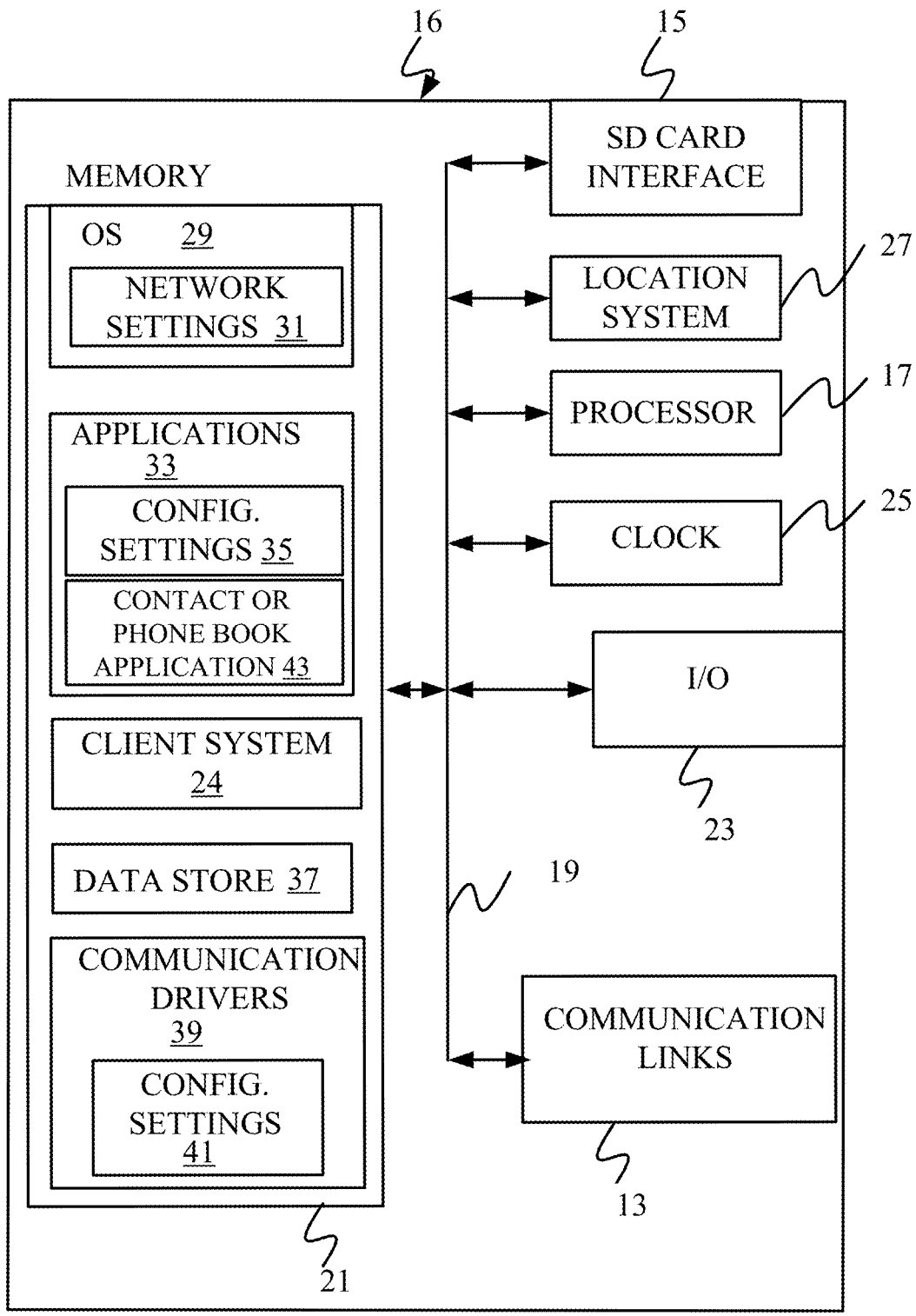
FIGS. 6-8 show examples of mobile devices that can be used in the architectures shown in the previous figures.
Figure 7:
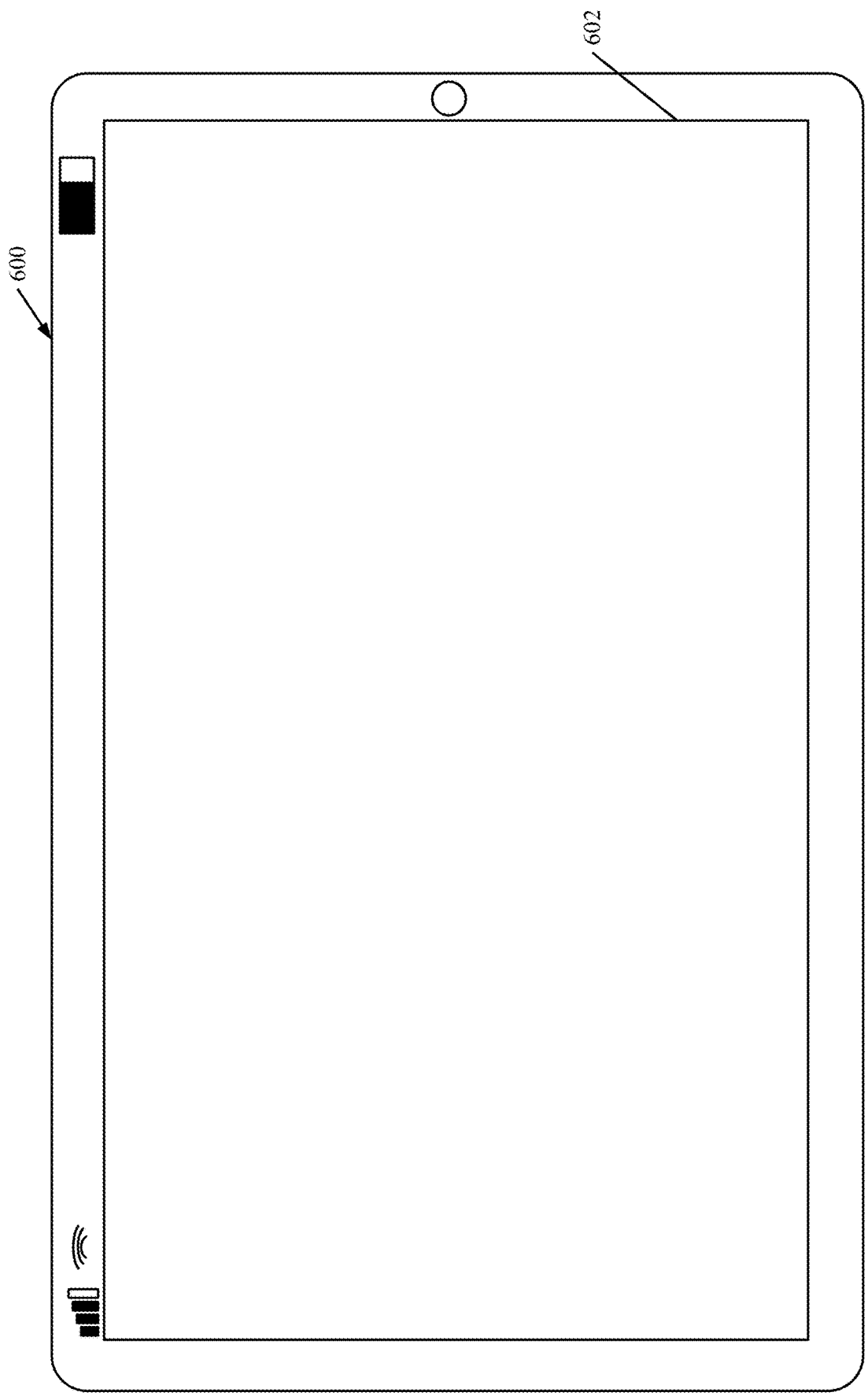
Figure 8:
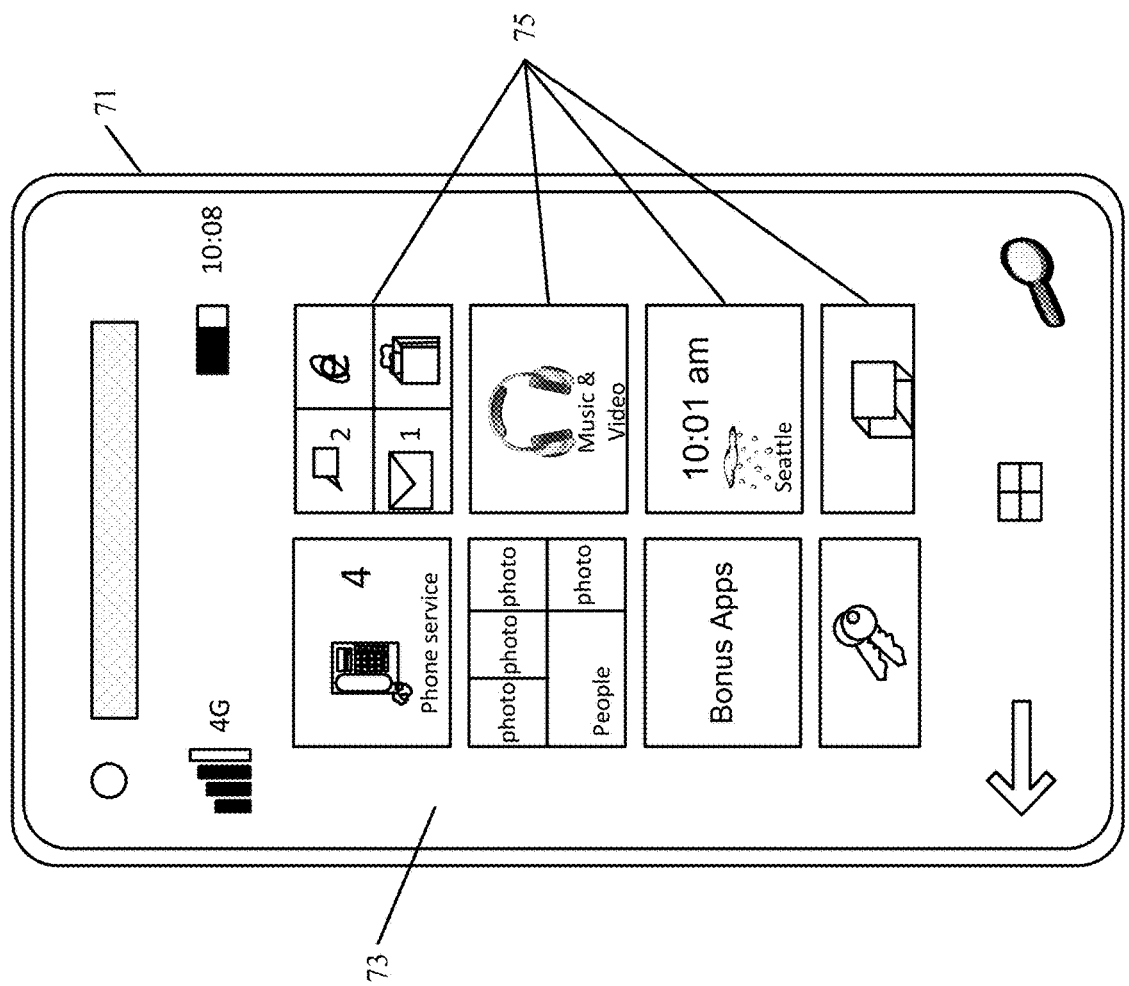

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
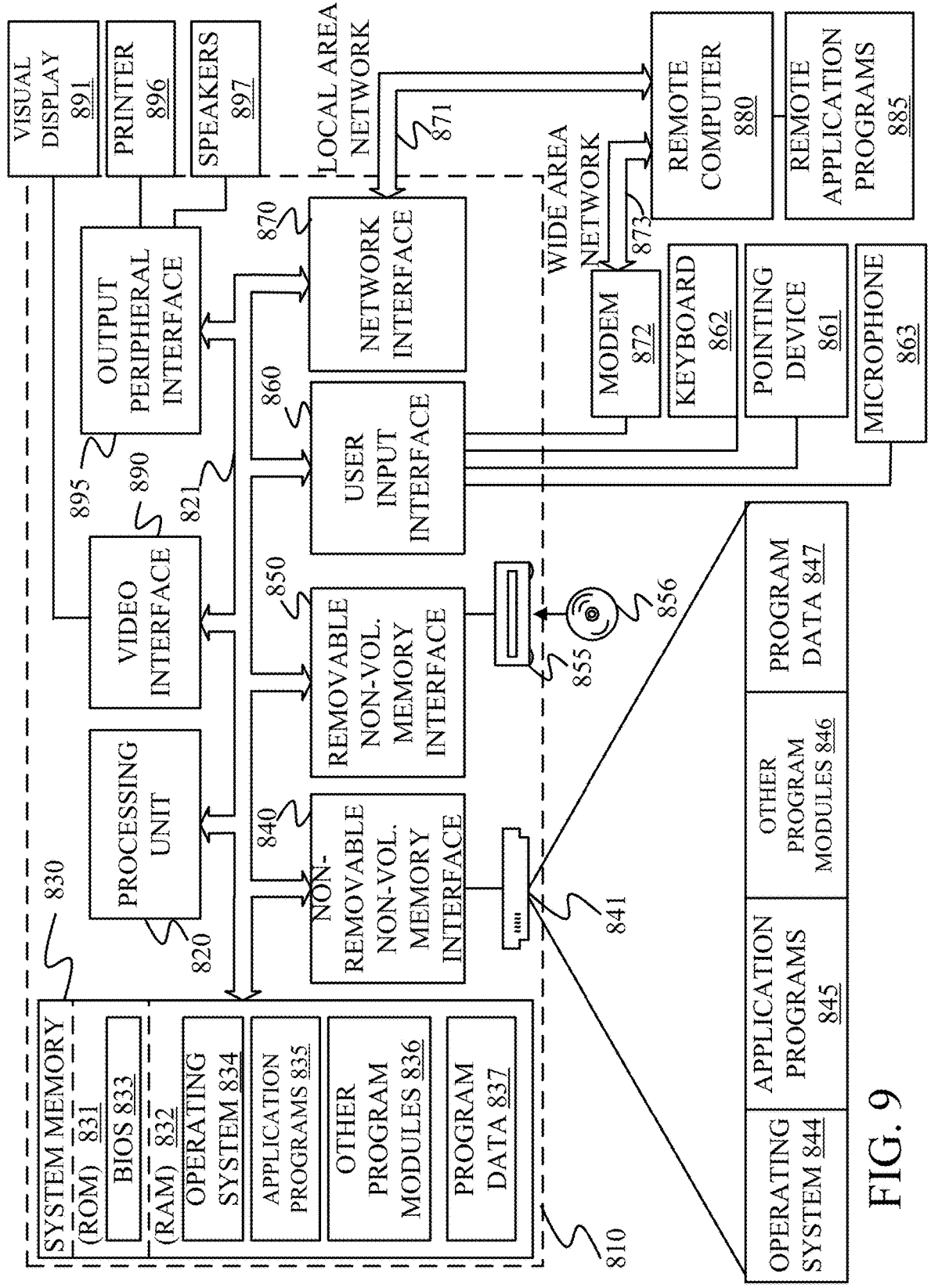
FIG. 9 is a block diagram of one example of a computing environment that can be used in the architectures shown in previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:
electronic mail (email) functionality displaying an email display corresponding to a user;
a next calendar item search system that identifies a next calendar item on a calendar for the user and generates a next item representation that includes a countdown time indicator indicative of a time until a scheduled start time for the identified next calendar item; and
visualization logic that surfaces the next item representation on the email display.

Example 2 is the computing system of any or all previous examples wherein the next calendar item search system comprises:
query generation/execution logic configured to search calendar data, for the calendar corresponding to the user, to identify the next calendar item, relative to a current time.

Example 3 is the computing system of any or all previous examples wherein the next calendar item search system comprises:
countdown generator logic configured to generate the countdown time indicator by determining a time period from the current time to the scheduled start time of the identified calendar item, the countdown generator logic being configured to update the countdown time indicator on the surfaced next item representation.

Example 4 is the computing system of any or all previous examples wherein the countdown generator logic is configured to update the countdown time indicator until a threshold time period after the scheduled start time of the identified next calendar item.

Example 5 is the computing system of any or all previous examples wherein the countdown generator logic is configured to update the countdown time indicator until a variable threshold time period after the scheduled start time of the identified next calendar item, the variable threshold time period varying based on a duration of the identified next calendar item.

Example 6 is the computing system of any or all previous examples wherein the next calendar item search system comprises:

filter logic configured to apply a filter criterion to the identified next calendar item to filter out the identified next calendar item if it meets the filter criterion.

Example 7 is the computing system of any or all previous examples wherein, if the filter logic filters the next calendar item, then the query generation/execution logic is configured to identify a subsequent calendar item as the identified next calendar item.

Example 8 is the computing system of any or all previous examples wherein the next calendar item search system comprises:

search initiation logic configured to determine that a calendar search is to be performed to identify the next calendar item and initiate the query generation/execution system to search the calendar data.

Example 9 is the computing system of any or all previous examples wherein the next calendar item search system comprises:

a metadata identifier configured to identify metadata corresponding to of the identified next calendar item; and a service identifier configured to identify a service to be searched to obtain additional information corresponding to the identified next calendar item, based on the metadata corresponding to the identified next calendar item.

Example 10 is the computing system of any or all previous examples wherein the query generation/execution logic comprises:

search logic that searches the identified service to obtain the additional information corresponding to the identified next calendar item.

Example 11 is the computing system of any or all previous examples wherein the visualization logic surfaces the additional information on the next item representation on the email display.

Example 12 is a computer implemented method, comprising:

displaying an email display corresponding to a user;

identifying a next calendar item on a calendar for the user;

generating a next item representation that includes a countdown time indicator indicative of a time until a scheduled start time for the identified next calendar item; and surfacing the next item representation on the email display.

Example 13 is the computer implemented method of any or all previous examples wherein identifying the next calendar item comprises:

searching calendar data, for the calendar corresponding to the user, to identify the next calendar item, relative to a current time.

Example 14 is the computer implemented method of any or all previous examples wherein identifying the next calendar item comprises:

generating the countdown time indicator by determining a time period from the current time to the scheduled start time of the identified calendar item; and updating the countdown time indicator on the surfaced next item representation.

Example 15 is the computer implemented method of any or all previous examples wherein updating the countdown time indicator comprises:

updating the countdown time indicator until a threshold time period after the scheduled start time of the identified next calendar item.

Example 16 is the computer implemented method of any or all previous examples wherein updating the countdown time indicator comprises:

updating the countdown time indicator until a variable threshold time period after the scheduled start time of the identified next calendar item, the variable threshold time period varying based on a duration of the identified next calendar item.

Example 17 is the computer implemented method of any or all previous examples wherein identifying the next calendar item comprises:

applying a filter criterion to the identified next calendar item to filter out the identified next calendar item if it meets the filter criterion; and if the next calendar item is filtered out, identifying a subsequent calendar item as the identified next calendar item.

Example 18 is the computer implemented method of claim 14 wherein identifying the next calendar item comprises:

identifying metadata corresponding to the identified next calendar item;

identifying a service to be searched to obtain additional information corresponding to the identified next calendar item, based on the metadata corresponding to the identified next calendar item; and searching the identified service to obtain the additional information corresponding to the identified next calendar item.

Example 19 is the computer implemented method of any or all previous examples wherein surfacing the next item representation comprises:

surfacing the additional information on the next item representation on the email display.

Example 20 is a computing system, comprising:

electronic mail (email) functionality displaying an email display corresponding to a user;

query generation/execution logic configured to search calendar data, for a calendar corresponding to the user, to identify a next calendar item, relative to a current time, on the calendar corresponding to the user;

countdown generator logic configured to generate a countdown time indicator by determining a time period from the current time to a scheduled start time of the identified calendar item, the countdown generator logic being configured to update the countdown time indicator; and visualization logic that surfaces a next item representation on the email display, the next item representation including a next item identifier identifying the identified next calendar item and the countdown time indicator.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:

at least one processor; and memory storing instructions executable by the at least one processor, wherein the instructions, when executed, cause the computing system to:

search an electronic calendar that is associated with a user and stores a plurality of calendar items representing calendar events;

identify, by the at least one processor, a scheduled start time for each particular calendar item of the plurality of calendar items, the scheduled start time corresponding to the calendar event represented by the particular calendar item;

identify a first calendar item, from the plurality of calendar items, based on the scheduled start times corresponding to the calendar events, the first calendar item comprising a next calendar item relative to a current time;

generate a countdown time indicator by determining a time period from the current time to the scheduled start time of the next calendar item;

instruct an email client to display an email user interface display on a display device, the email user interface display comprising:

a message display pane that displays a plurality of email messages in a mailbox corresponding to the user;

a reading display pane that displays a selected email message from the plurality of email messages in the mailbox; and a next calendar item display pane that persistently displays a next item display element that includes details of the next calendar item from the electronic calendar and the countdown time indicator that is dynamically updated to indicate a time until the scheduled start time for the next calendar item;

identify a duration of the calendar event represented by the next calendar item;

determine a threshold time period for display of the countdown time indicator based on the duration of the calendar event; and update the countdown time indicator until the threshold time period after the scheduled start time of the next calendar item is reached.

2. The computing system of claim 1 wherein the instructions cause the computing system to:

apply a filter criterion to the first calendar item to filter out the first calendar item based on the first calendar item meeting the filter criterion.

3. The computing system of claim 2 wherein instructions cause the computing system to:

in response to the first calendar item being filtered out, identify a second calendar item, temporally subsequent to the first calendar item, as the next calendar item.

4. The computing system of claim 1 wherein the instructions cause the computing system to:

determine that a calendar search is to be performed to identify the next calendar item and, in response, initiate the search of the electronic calendar.

5. The computing system of claim 1 wherein the instructions cause the computing system to:

identify metadata corresponding to of the identified next calendar item; and identify a service to be searched to obtain additional information corresponding to the identified next calendar item, based on the metadata corresponding to the identified next calendar item.

6. The computing system of claim 5 wherein the instructions cause the computing system to:

search the identified service to obtain the additional information corresponding to the identified next calendar item.

7. The computing system of claim 6 wherein the instructions cause the computing system to display the additional information on the next item display element on the email user interface display.

8. A method performed by a computing system, the method comprising:

searching an electronic calendar that is associated with a user and stores a plurality of calendar items representing calendar events;

identifying a scheduled start time for each particular calendar item of the plurality of calendar items, the scheduled start time corresponding to the calendar event represented by the particular calendar item;

identifying a first calendar item, from the plurality of calendar items, based on the scheduled start times corresponding to the calendar events, the first calendar item comprising a next calendar item relative to a current time;

generating a countdown time indicator by determining a time period from the current time to the scheduled start time of the identified next calendar item;

instructing an email client to display an email user interface display on a display device, the email user interface display comprising:

a message display pane that displays a plurality of email messages in a mailbox corresponding to the user;

a reading display pane that displays a selected email message from the plurality of email messages in the mailbox; and a next calendar item display pane that persistently displays a next item display element that includes details of the next calendar item from the electronic calendar and a countdown time indicator that is dynamically updated to indicate a time until the scheduled start time for the next calendar item;

identifying a duration of the calendar event represented by the next calendar item;

determining, by a processor of the computing system, a threshold time period for display of the countdown time indicator based on the duration of the calendar event; and updating, by the processor of the computing system, the countdown time indicator until the threshold time period after the scheduled start time of the next calendar item is reached.

9. The method of claim 8, and further comprising:

applying a filter criterion to the first calendar item to filter out the first calendar item based on the first calendar item meeting the filter criterion.

10. The method of claim 9 and further comprising:

in response to the first calendar item being filtered out, identifying a second calendar item, temporally subsequent to the first calendar item, as the next calendar item.

11. The method of claim 8 and further comprising:

identifying metadata corresponding to the identified next calendar item;

identifying a service to be searched to obtain additional information corresponding to the identified next calendar item, based on the metadata corresponding to the identified next calendar item; and searching the identified service to obtain the additional information corresponding to the identified next calendar item.

12. The method of claim 11 and further comprising:

displaying the additional information on the next item display element on the email user interface display.

13. The method of claim 8, and further comprising:
determining that a calendar search is to be performed to identify the next calendar item and, in response, initiating the search of the electronic calendar.

14. A computing system comprising:
at least one processor; and
memory storing instructions executable by the at least one processor, wherein the instructions, when executed, cause the computing system to:
- search, by the at least one processor, an electronic calendar that is associated with a user and stores a plurality of calendar items each representing a calendar event having a corresponding scheduled start time;
- identify a first calendar item, from the plurality of calendar items, based on the corresponding scheduled start times, the first calendar item comprising a next calendar item from a current time;
- filter out the first calendar item based on the first calendar item meeting a filter criterion;
- in response to the first calendar item being filtered out, identify a second calendar item comprising a next calendar item from the first calendar item;
- generate a countdown time indicator by determining a time period from the current time to the scheduled start time corresponding to the second calendar item; and
- instruct an email client to display an email user interface display on a display device, the email user interface display comprising:
  - a message display pane that displays a plurality of email messages in a mailbox corresponding to the user;
  - a reading display pane that displays a selected email message from the plurality of email messages in the mailbox; and
  - a next calendar item display pane that persistently displays a next item display element that includes details of the second calendar item from the electronic calendar and the countdown time indicator that is dynamically updated to indicate a time until the scheduled start time for the second calendar item.

15. The computing system of claim 14, wherein the instructions cause the computing system to update the countdown time indicator until a threshold time period after the scheduled start time of the identified second calendar item.

16. The computing system of claim 15, wherein the variable threshold time period is based on a duration of the identified second calendar item.

* * * * *